(12) United States Patent
Eisenberg

(10) Patent No.: US 11,696,656 B2
(45) Date of Patent: Jul. 11, 2023

(54) MAGNETIC UTENSIL HOLDING DEVICE

(71) Applicant: Edward Eisenberg, Gallatin, TN (US)

(72) Inventor: Edward Eisenberg, Gallatin, TN (US)

( * ) Notice: Subject to any disclaimer, the term of this patent is extended or adjusted under 35 U.S.C. 154(b) by 338 days.

(21) Appl. No.: 16/934,229

(22) Filed: Jul. 21, 2020

(65) Prior Publication Data

US 2021/0068566 A1 Mar. 11, 2021

Related U.S. Application Data

(60) Provisional application No. 62/897,715, filed on Sep. 9, 2019.

(51) Int. Cl.
| | | |
|---|---|---|
| *A47G 19/10* | (2006.01) | |
| *H01F 7/02* | (2006.01) | |
| *A47J 47/16* | (2006.01) | |
| *A47G 21/14* | (2006.01) | |
| *A47G 29/087* | (2006.01) | |

(52) U.S. Cl.
CPC .............. *A47G 19/10* (2013.01); *A47G 21/14* (2013.01); *A47G 29/087* (2013.01); *A47J 47/16* (2013.01); *H01F 7/02* (2013.01); *A47G 2200/106* (2013.01); *H01F 7/0252* (2013.01)

(58) Field of Classification Search
CPC ...... A47G 19/10; A47G 21/14; A47G 29/087; A47G 2200/106; A47J 47/16; H01F 7/02; H01F 7/0252
See application file for complete search history.

(56) References Cited

U.S. PATENT DOCUMENTS

| 5,396,999 A | * | 3/1995 | Sandheinrich |
| 2012/0267922 A1 | | 10/2012 | Fleming |
| 2013/0105492 A1 | | 5/2013 | Melgoza |

(Continued)

FOREIGN PATENT DOCUMENTS

| GB | 2332361 A | 6/1999 |
| GB | 2424357 A | 9/2006 |

OTHER PUBLICATIONS

James Holloway, "'Bye bye wind' garden table protects paper plates from breezes," News Atlas, Jul. 24, 2012, accessible at: https://newatlas.com/bye-bye-wind-garden-table/23431/, accessed on Nov. 11, 2020.

(Continued)

*Primary Examiner* — Andrew D Perreault
(74) *Attorney, Agent, or Firm* — Gearhart Law, LLC

(57) ABSTRACT

A utensil holder is described. The holder includes a base portion and a sidewall portion coupled to a periphery of and extending outward from the base portion. The sidewall portion and the base portion define a utensil receiving portion. An opening of the base portion receives a first magnetic component therein. At least one securement mechanism engaged to the sidewall portion secures the utensil in the utensil receiving portion. A material is affixed at one end to a location on the sidewall portion and is affixed at another end to a second magnetic component. The first and second magnetic component are of opposing polarities such that when the second magnetic component is placed beneath a surface the holder is resting on, the first magnetic component is configured in a magnetic attraction with the second magnetic component to maintain a location of the holder on the surface.

13 Claims, 16 Drawing Sheets

(56) References Cited

U.S. PATENT DOCUMENTS

2014/0299608 A1 10/2014 Melo
2019/0133351 A1 5/2019 Carroll et al.

OTHER PUBLICATIONS

Andrew Liszewski, "This Outdoor Table's Recessed Grooves Stop the Wind From Blowing Away Your Meal," Gizmodo, Jul. 14, 2012, accessible at: https://gizmodo.com/this-outdoor-tables-recessed-grooves-stop-the-wind-from-5926001, accessed on Nov. 11, 2020.

* cited by examiner

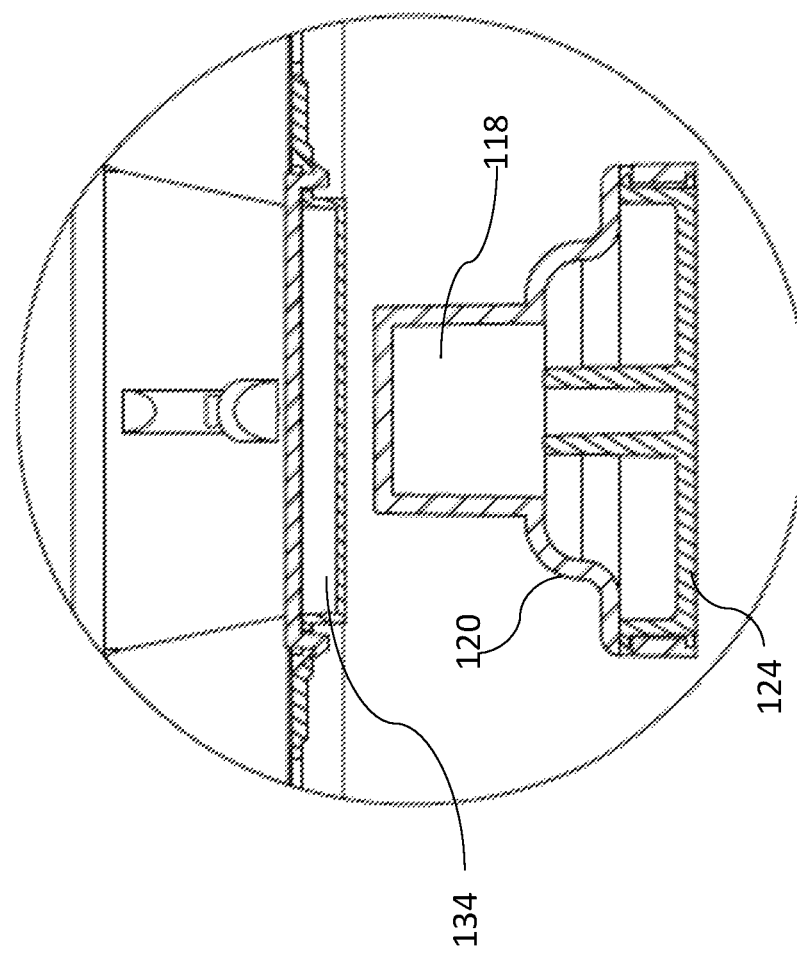

MAGNETIC UTENSIL HOLDING DEVICE

CROSS-REFERENCE TO RELATED APPLICATIONS

This application is a U.S. Non-Provisional Patent Application that claims priority from U.S. Provisional Patent Application No. 62/897,715, filed on Sep. 9, 2019, the contents of which are hereby fully incorporated by reference.

FIELD OF THE EMBODIMENTS

The field of the present invention and its embodiments relate to magnetic tableware configured to fix a position of the tableware upon a piece of furniture or another secondary object. In particular, the present invention and its embodiments provide for a utensil holder that prevents knocking, blowing, etc. of a utensil, thereby preventing spillage of the food or other item disposed thereon.

BACKGROUND OF THE EMBODIMENTS

When the weather permits, outdoor dining is a favorite activity amongst families and friends. However, while the weather may encourage outdoor dining, the wind is often a factor in outdoor gatherings. Tableware items placed on a standard table, such as a picnic table, can often be caught in wind gusts and then blown from the table surface. For example, a wind gust can go under a plate and lift the plate off a table surface. This is further seen when the tableware items, such as plates, cups, bowls, etc., are empty on an outdoor table. When wind gusts are present, not only will empty tableware items be blown from the table surface, but tableware items containing food or beverages can also be tipped over and spilled.

Additionally, many children often partake in these outdoor dining experiences. Many children, while enjoyable to be around, can run under, around, and climb on tables and people causing items to be jostled and dropped thereby spilling food and beverages. It is desirable to secure the tableware items to prevent this spillage and spoiling of the food and beverage.

The present invention and its embodiments provide system where the tableware items are positioned upon a table or the like, such that the tableware items stay in place, even in the presence of medium to high wind gusts and unruly guests. Thus, the present invention and its embodiments eliminate the difficulty of keeping tableware items on a tabletop for use in outdoor dining.

Review of Related Technology:

U.S. Patent Application 2019/0133351 pertains to support body having a magnetic or ferromagnetic component to adhere the support body to a magnetic or ferromagnetic support, such as a tabletop by magnetic attraction. A reusable adhering component, such as a stretch-releasable pressure sensitive adhesive tape is disposed on a top surface of the support body to removably attach tableware or dishware to the support body. The support body can be in the form of a plate, a coaster, a placemat, or other known configuration. Alternatively, a support body can be releasably secured to a table top or other support surface by a releasable attaching device such as a suction cup and a supported body can be releasably attached to a piece of tableware or dishware by a releasable attaching device such as a suction cup, and the support body and the supported body can be magnetically attached to each other.

U.S. Patent Application 2014/0299608 pertains to a highchair system that enables removable attachment of objects to a tray of the highchair and protects the highchair from food and liquid spills. A flexible slipcover is removably attachable to the highchair tray so as to extend over at least an upper surface thereof. A permanent magnet or a ferromagnetic material is associated with the slipcover. Objects, such as a dish or a toy, are held in place on the highchair tray by magnetic attraction forces. Tethered utensils may be removably attachable to the dish.

U.S. Patent Application 2013/0105492 pertains to a tableware system wherein tableware items are operably coupled to magnets for magnetically coupling the tableware items to a table top or placemat, such that the tableware items stay in place on the placemat or table top due to magnetic attraction between the magnets of the tableware items and metallic members disposed in the table top or placemat.

U.K. Patent Application 2332361 pertains to magnetic means of adherence. Table articles such as drinking glasses, cups, plates, cutlery are kept in the position required without spillage or breakage taking place, by placing magnets into the bases of the above listed items or in a supporting surface such as a table top, beer mat, table cloth or drip towel. A receptive metal or other material is provided in the other of the item and support to respond to the magnet.

U.K. Patent Application 2424357 pertains to tableware such as a child's feeding dish with a magnetized base and a separate magnet which attaches to the underside of a table. The separate magnet sits on the underside of the table directly beneath the dish to prevent the dish from being lifted by a child. The magnetic base may be attached to any type of tableware such as a plate, bowl or lunchbox that may be made from breakable or non-breakable materials that may be dishwasher and microwave safe. To remove the dish from the table, the separate magnet should be removed from the table.

Various devices are known in the art. However, their structure and means of operation are substantially different from the present disclosure. The other inventions also fail to solve all the problems taught by the present disclosure. At least one embodiment of this invention is presented in the drawings below and will be described in more detail herein.

SUMMARY OF THE EMBODIMENTS

The present invention and its embodiments relate to magnetic tableware configured to fix a position of the tableware upon a piece of furniture or another secondary object. In particular, the present invention and its embodiments provide for a utensil holder that prevents knocking, blowing, etc. of a utensil, thereby preventing spillage of the food or other item disposed thereon.

A holder for a utensil is described herein. The holder may include a base portion having a first side disposed opposite a second side and a sidewall portion coupled to a periphery of and extending outward from the first side of the base portion. The sidewall portion and the first side of the base portion define a utensil receiving portion. The holder also includes at least one securement mechanism engaged to the sidewall portion, a first magnetic component, and a second magnetic component. The holder further includes a material having a first side disposed opposite a second side, where the first side of the material is affixed to a location on the sidewall portion and the second side of the material is affixed to the second magnetic component.

In a first embodiment, the at least one securement mechanism is slidably engaged to the sidewall portion. In this first embodiment, the at least one securement mechanism comprises a first prong and a second prong. A size adjuster is disposed along an outer surface of the first prong. Moreover, the size adjuster is configured to secure a position of the at least one securement mechanism when engaged to the sidewall portion. In a second embodiment, each of the at least one securement mechanism comprises a planar flap. Further, each of the at least one securement mechanism is affixed to the sidewall portion.

In the first embodiment, the first magnetic component is planar and is encapsulated in the base portion or is removable from the base portion. The first magnetic component may be encapsulated in a sheath. In examples, the sheath is comprised of a first conical section and a second conical section. The first conical section is coupled to the second conical section.

In the second embodiment, the holder also includes an opening spanning a width of the base portion. In this embodiment, the first magnetic component comprises one or more projecting members and the opening comprises one or more recessed members. As such, the first magnetic component is received by the opening and is secured to the base portion of the holder when the one or more projecting members are received by the one or more recessed members.

In the first embodiment, the second magnetic component comprises a first section and a second section. The first section is coupled to the second section. Moreover, the first section comprises a first base portion and a first terminal portion and the second section comprises a second base portion and a second terminal portion. Each of the first base portion and the second base portion are wider than the first terminal portion and the second terminal portion.

In the second embodiment, the second magnetic component comprises a first section and a second section. The first section of the second magnetic component comprises: a first base portion, a first protrusion, and an intermediate portion disposed between the first base portion and the first protrusion. The intermediate portion comprises one or more recessed members. The second section of the second magnetic component comprises a second base portion having a first side disposed opposite a second side. The first side of the second base portion includes a second protrusion and one or more projecting members. In this second embodiment, the one or more recessed members of the intermediate portion associated with the first section of the second magnetic component are configured to receive the one or more projecting members of the second section of the second magnetic component to affix the first section of the second magnetic component to the second section of the second magnetic component.

Another embodiment of the present invention describes a holder for a utensil (such as a plate). The holder may include a base portion having a first side disposed opposite a second side, where the second side is disposed along a surface. The holder also includes a sidewall portion coupled to a periphery of and extending outward from the first side of the base portion. The sidewall portion and the first side of the base portion define a utensil receiving portion.

In other examples, the holder includes at least one securement mechanism engaged to the sidewall portion. In a first embodiment, the at least one securement mechanism is slidably engaged to the sidewall portion. In this first embodiment, the at least one securement mechanism comprises a first prong and a second prong and one or more size adjusters disposed along an outer surface of the first prong. The first prong is separated by a distance from the second prong at a first end and coupled to the second prong at a second end.

In a second embodiment, each of the at least one securement mechanism comprises a planar flap. Moreover, in this second embodiment, each of the at least one securement mechanism is affixed to the sidewall portion.

The holder also includes a first magnetic component and a second magnetic component. The first magnetic component and the second magnetic component are of opposing polarities. In some examples, a magnetic portion is removable from the first magnetic component and/or the second magnetic component. In further examples, the holder may include a material having a first side disposed opposite a second side. The first side of the material is affixed to a location on the sidewall portion and the second side of the material is affixed to the second magnetic component.

To use the second embodiment of the holder, the first magnetic component may first be received by the opening of the base portion and may be secured to the base portion of the holder when the one or more projecting members of the first magnetic component are received by the one or more recessed members of the opening. To use the first embodiment of the holder, this first step may be omitted. Then, to use either the first or the second embodiment of the holder, the user will position the utensil in the utensil receiving portion of the holder. The at least one securement mechanism may be used to secure or retain the utensil to the holder to prevent the utensil from inadvertently being blown away or from falling out of the holder.

Since the first magnetic component and the second magnetic component are of differing polarities, once the holder receives the utensil and is positioned upon the surface (such as the tabletop), the second magnetic component is placed beneath the surface such that the first magnetic component is configured in a magnetic attraction with the second magnetic component to maintain a location of the holder (and additionally the utensil) on the surface. Such magnetic attraction occurs through the surface (such as the tabletop). As a result, the holder is "magnetically adhered" to the surface (such as the tabletop).

In general, the present invention succeeds in conferring the following, and others not mentioned, benefits and objectives.

It is an object of the present invention to provide a tableware item that is configured to securely hold at least one common type of tableware.

It is an object of the present invention to provide a tableware item that utilizes magnets to secure a position of the tableware item.

It is an object of the present invention to provide a tableware item that is lightweight and highly portable.

It is an object of the present invention to provide a tableware item that is easy and safe to use.

It is an object of the present invention to provide a tableware item that prevents spilling and spoiling of food and beverage.

It is an object of the present invention to provide a tableware item that can be used with tableware, such as plates, of various sizes.

It is an object of the present invention to provide a tableware item that can be readily secured upon a dining or other surface and removed as necessary.

It is an object of the present invention to provide a tableware item that further assists in securely carrying the tableware item as one travels between two locations.

It is an object of the present invention to provide a tableware item that may be used by those of all ages.

BRIEF DESCRIPTION OF THE DRAWINGS

FIG. 16 depicts a side perspective view of a second embodiment of a utensil holder, showcasing a first magnetic component configured in a magnetic attraction with a second magnetic component, according to at least some embodiments disclosed herein.

DESCRIPTION OF THE PREFERRED EMBODIMENTS

Figure 1:
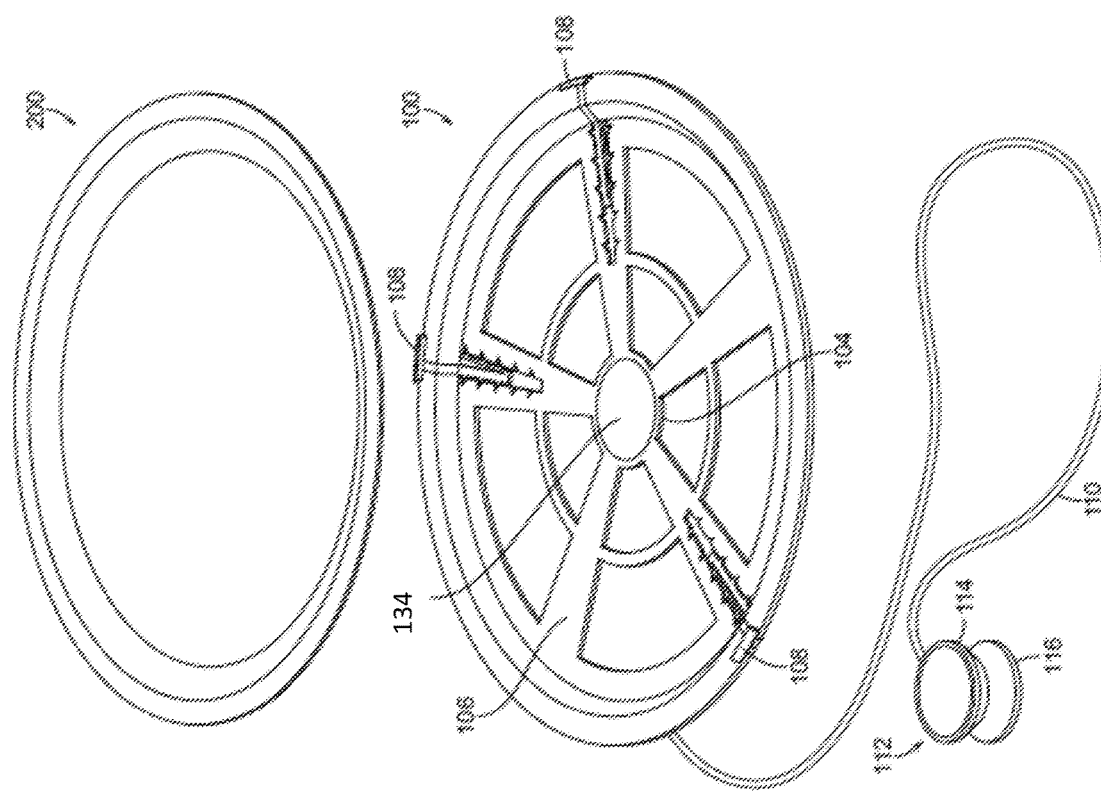
FIG. 1 depicts an upper perspective view of a first embodiment of a utensil holder, according to at least some embodiments disclosed herein.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

A holder 100 for a utensil 200 is described herein. A first embodiment of the holder 100 for the utensil 200 is depicted in FIG. 1-FIG. 6. A second embodiment of the holder 100 for the utensil 200 is depicted in FIG. 7-FIG. 16. In some examples of the first embodiment and/or the second embodiment, the utensil 200 is a plate, as depicted in FIG. 1 and FIG. 7. In examples where the utensil 200 is the plate, the plate may generally be any known plate, including both disposable plates made from lightweight materials, paper, etc. and non-disposable plates. However, the utensil 200 is not limited to the examples explicitly described herein. The holder 100 may be comprised of varying ornamental construction(s) and may be generally comprised of a polymer. However, other materials for the holder 100 may be utilized under the purview of this present application.

The holder 100 of the first embodiment and the second embodiment comprises numerous components, such as: a base portion 104 (depicted in, at least, FIG. 1, FIG. 7, FIG. 9, FIG. 10, and FIG. 11). The base portion 104 has a first side disposed opposite a second side. The base portion 104 is generally shaped to provide rigidity to the holder 100, as well as provide a surface shaped generally to receive the utensil 200. The base portion 104 generally has a number of spokes (depicted in FIG. 1, FIG. 2, FIG. 3, FIG. 7, FIG. 9, FIG. 10, FIG. 11, and FIG. 12) radiating outward from a center of the base portion 104. In some examples, the base portion 104 further comprises at least a portion thereof that is magnetic or otherwise exhibits magnetic properties.

A sidewall portion 106 (as depicted in FIG. 1, FIG. 7, FIG. 9, FIG. 11, and FIG. 12) is coupled to the base portion 104 and is also generally shaped to provide rigidity to the holder 100. More specifically, the sidewall portion 106 is coupled to a periphery of the first side of the base portion 104 and extends outward from the first side of the base portion 104. The sidewall portion 106 and the first side of the base portion 104 define a utensil receiving portion. The utensil receiving portion is a receptacle or recess for the utensil 200 to be positioned thereon. The second side of the base portion 104 is disposed along a surface 300 (depicted in FIG. 4 and FIG. 13), such as a planar surface.

At least one securement mechanism 108 (depicted in FIG. 1-FIG. 7, FIG. 9, FIG. 11, FIG. 13, and FIG. 15) is engaged to the sidewall portion 106. The at least one securement mechanism 108 may be a size adjustment mechanism. The at least one securement mechanism 108 (e.g., the size adjustment mechanism) may be configured to "grasp" the utensil 200 that is inserted into a recessed area (e.g., the utensil receiving portion) of the holder 100. The at least one securement mechanism 108 can be manipulated to securely retain various sized utensils 200, etc. in the recessed area. This allows the holder 100 to be used in conjunction with tableware of varying shapes and sizes.

Each of the at least one securement mechanism 108 of the first embodiment, as shown in FIG. 1-FIG. 4, may be positioned at varying positions along the sidewall portion 106. It is preferable that the at least one securement mechanism 108 are positioned such that the utensil retainment properties can be exploited for maximum effect and utensil securement. In some embodiments, there is a securement mechanism of the at least one securement mechanism 108 positioned at each spoke of the holder 100. In other embodiments, and as shown in FIG. 1, not all spokes contain the at least one securement mechanism 108. In yet other embodiments, the at least one securement mechanism 108 are positioned such that the at least one securement mechanism 108 does not couple to a spoke of the holder 100.

Figure 3:
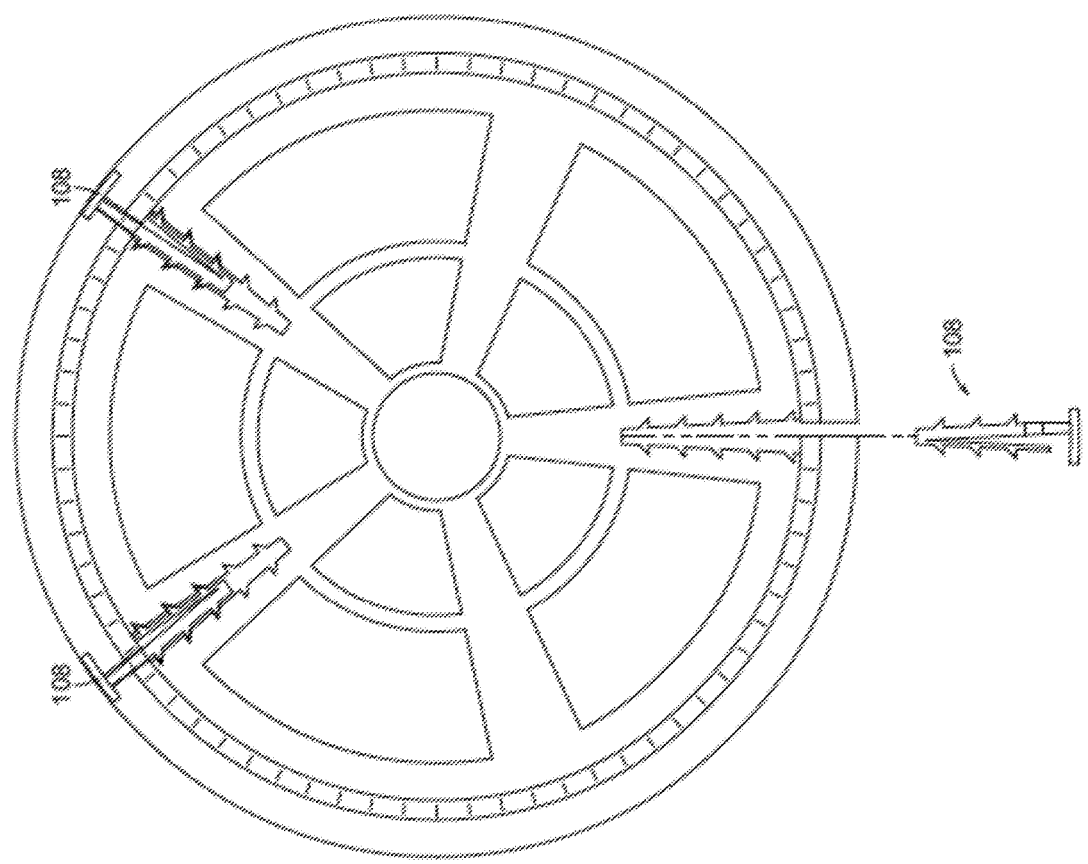
FIG. 3 depicts a top plan view showing a securement mechanism of a first embodiment of a utensil holder, according to at least some embodiments disclosed herein.
Figure 4:
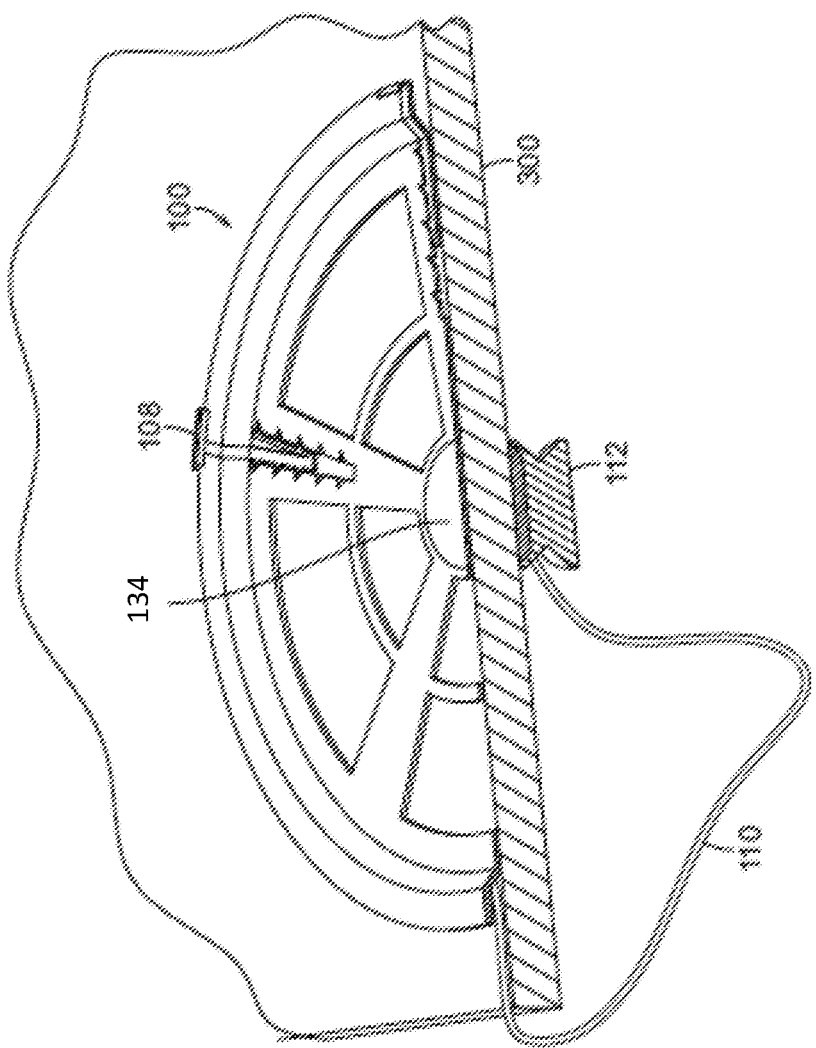
FIG. 4 depicts a sectional side view of a first embodiment of a utensil holder, according to at least some embodiments disclosed herein.
Figure 5:
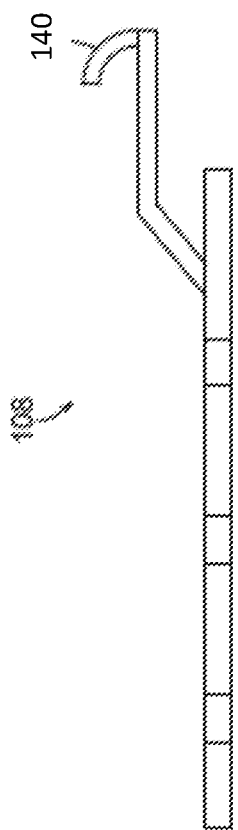
FIG. 5 depicts a side view of a securement mechanism of a first embodiment of a utensil holder, according to at least some embodiments disclosed herein.
Figure 6:
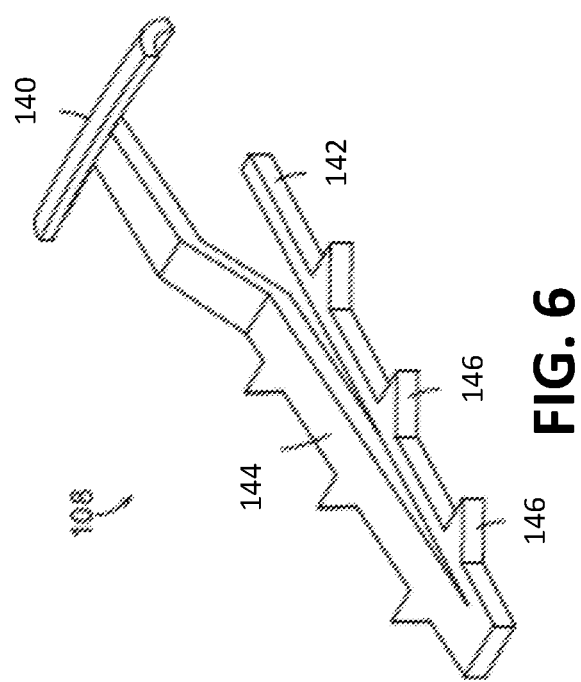
FIG. 6 depicts a top perspective view of a securement mechanism of a first embodiment of a utensil holder, according to at least some embodiments disclosed herein.
Figure 7:
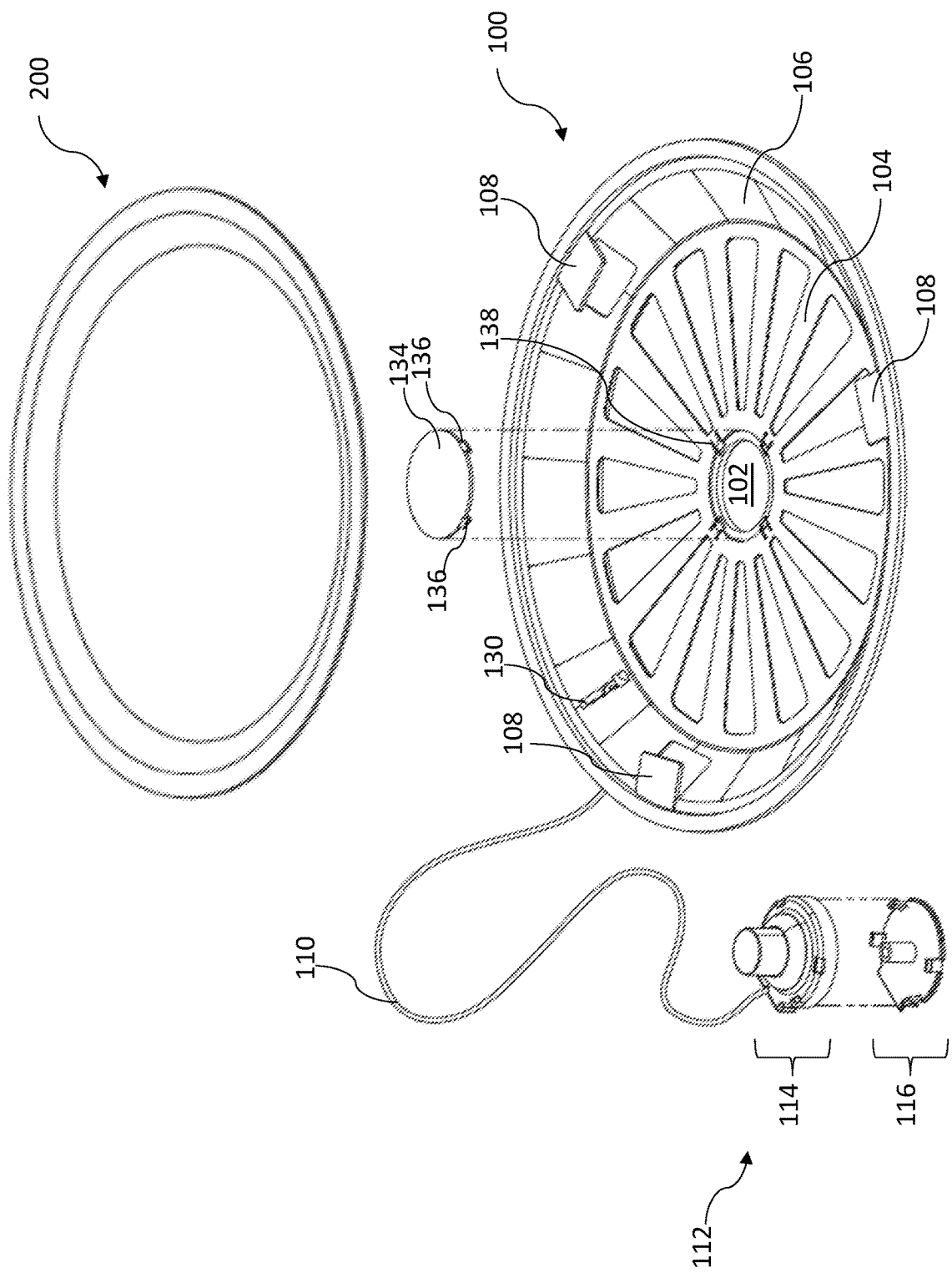
FIG. 7 depicts a top perspective view of a second embodiment of a utensil holder, according to at least some embodiments disclosed herein.
Figure 8:
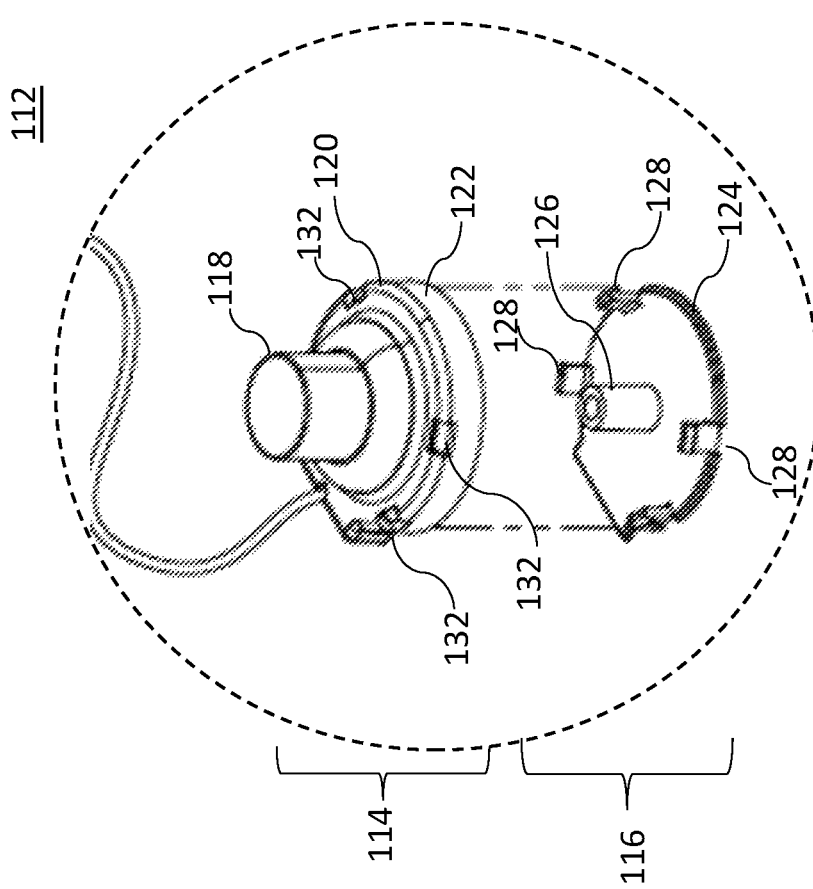
FIG. 8 depicts a perspective view of a second magnetic component of a second embodiment of a utensil holder, according to at least some embodiments disclosed herein.
Figure 9:
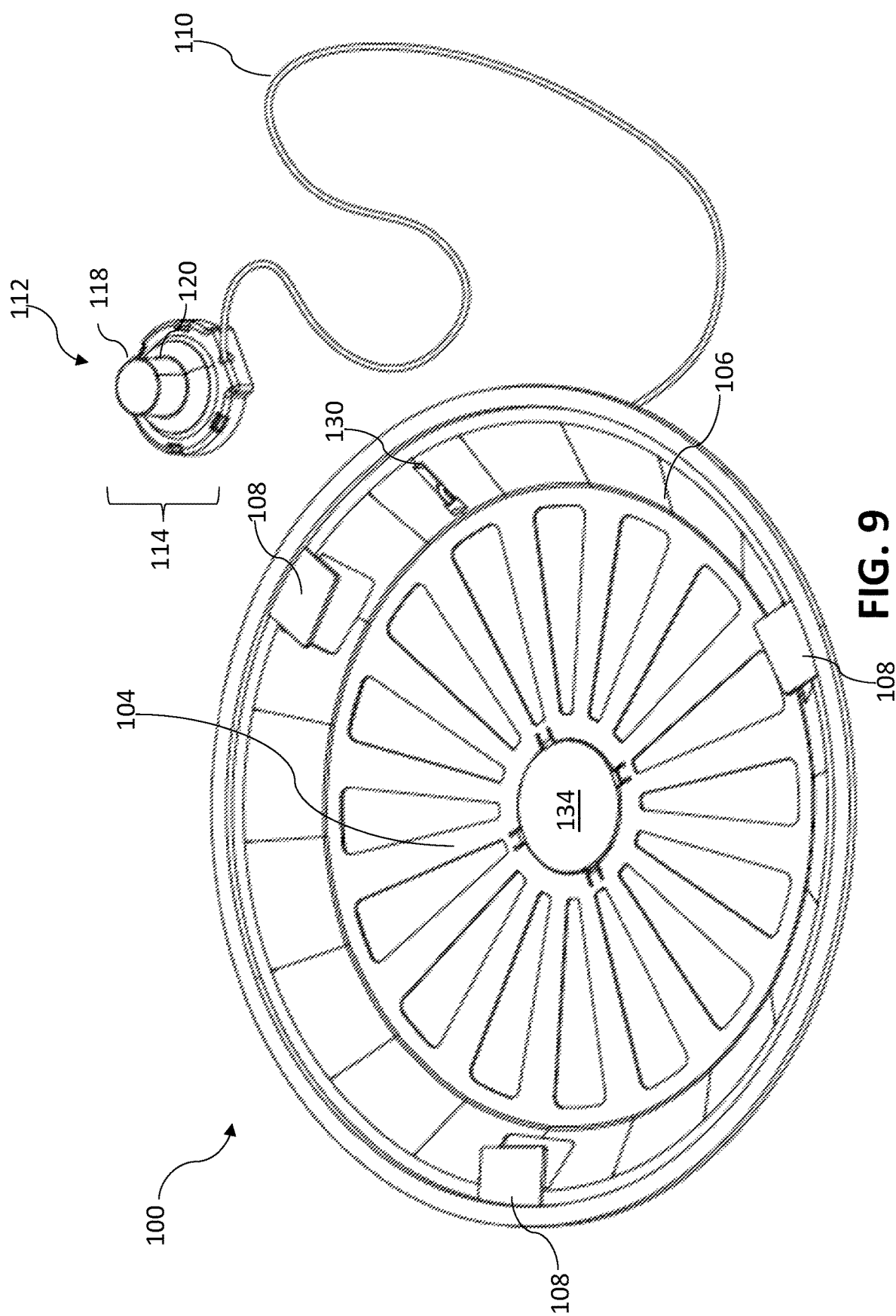
FIG. 9 depicts a top perspective view of a second embodiment of a utensil holder, according to at least some embodiments disclosed herein.
Figure 10:
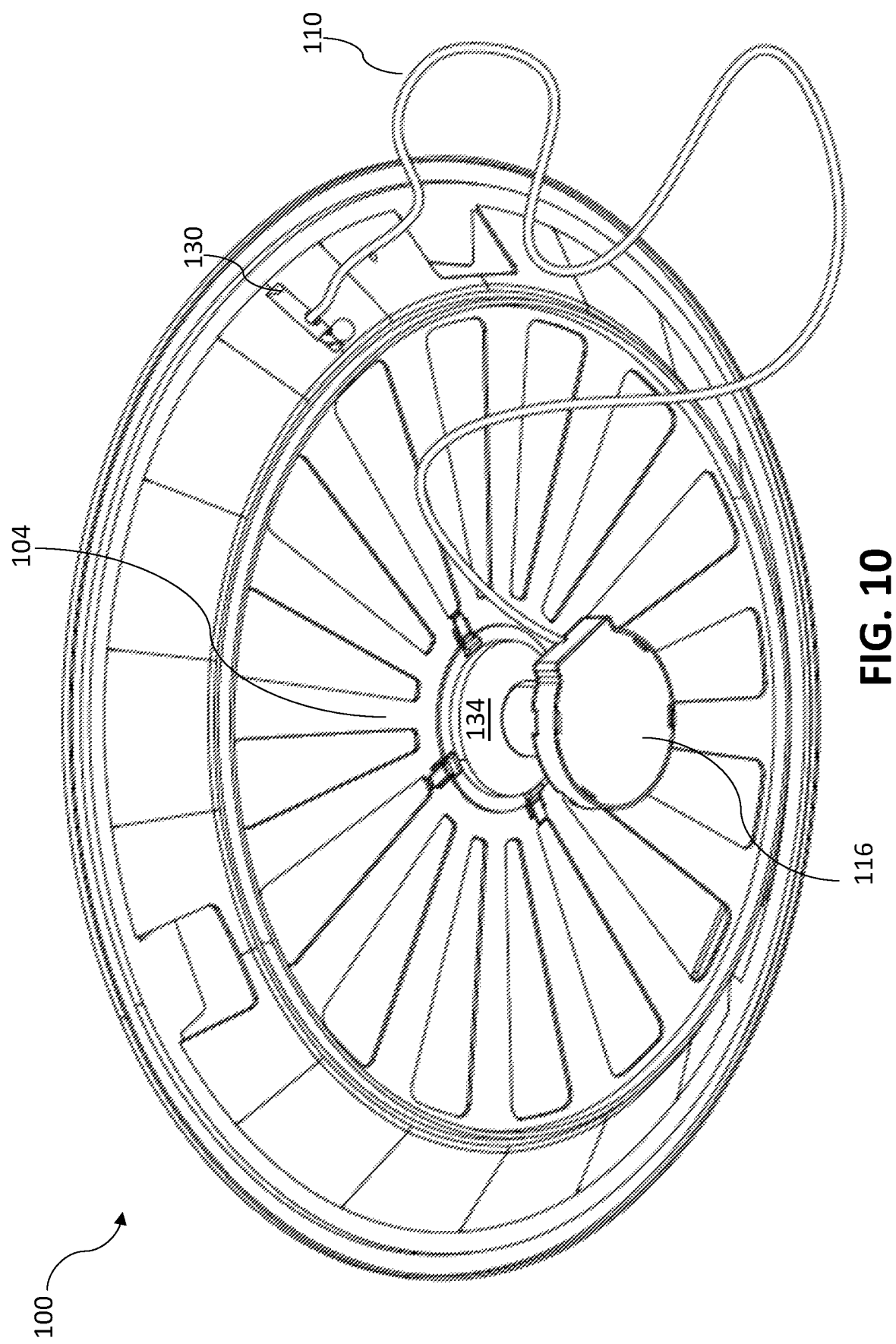
FIG. 10 depicts a bottom perspective view of a second embodiment of a utensil holder and a first magnetic component configured in a magnetic attraction with a second magnetic component, according to at least some embodiments disclosed herein.
Figure 11:
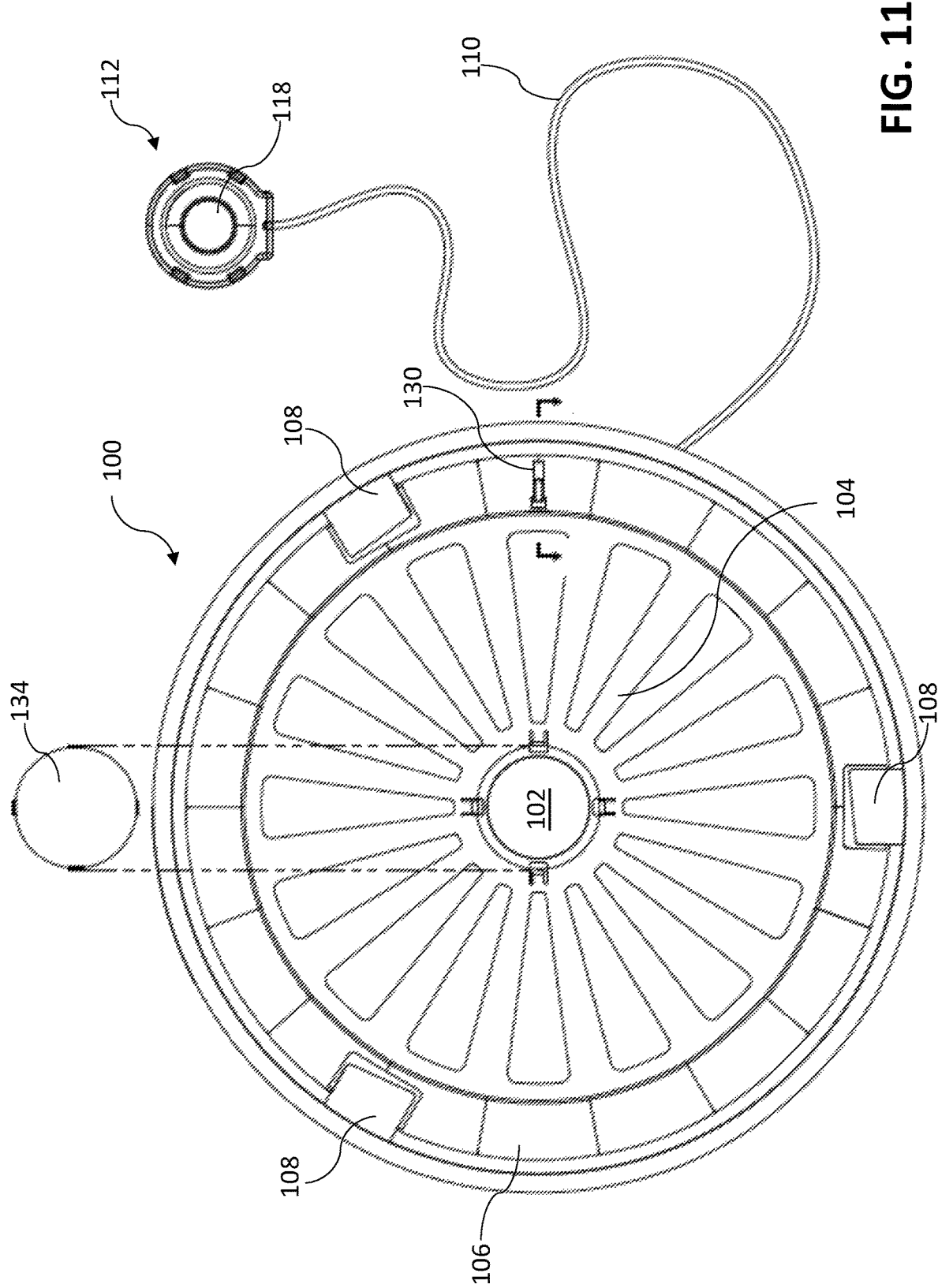
FIG. 11 depicts a top down perspective view of a second embodiment of a utensil holder, according to at least some embodiments disclosed herein.

Referring now to FIG. 5 and FIG. 6 of the first embodiment of the holder 100, the at least one securement mechanism 108 is shown to have a retainment edge 140, a first prong 142, a second prong 144, and a plurality of size adjusters 146. Referring now to FIG. 3, the at least one securement mechanism 108 is configured to be positioned at varying intervals along a length of the sidewall portion 106, depending on a size of the utensil 200. The sidewall portion 106 of the holder 100 has an adjustment receiving area configured to receive one securement mechanism of the at least one securement mechanism 108 therein. The adjustment receiving area is sized to allow the plurality of size adjusters 146, as shown in FIG. 6, to be selectively engaged to the holder 100, thereby allowing the selective positioning of the at least one securement mechanism 108 and by extension the retainment edge 140 (as depicted in FIG. 6).

As shown in FIG. 5 and FIG. 6, each of the at least one securement mechanism 108 can be shaped to align with a specific holder 100 in which the at least one securement mechanism 108 are used. Thus, the at least one securement mechanism 108 shown herein are for illustrative purposes only. However, regardless of the exact shape and size, each will of the at least one securement mechanism 108 of the first embodiment may comprise the retainment edge 140, the first prong 142, the second prong 144, and the size adjusters 146.

As shown in FIGS. 5 and 6, the first prong 142 is coupled to the second prong 144 at a second end of the at least one securement mechanism 108. At a first end of the at least one securement mechanism 108, the first prong 142, and the second prong 144 are separated by a distance. Such a distance may be variable but should allow for horizontal compression of the first prong 142, thereby closing or limiting the distance between the first prong 142 and the second prong 144. Further, the material comprising the at least one securement mechanism 108 may be selected to facilitate the rigidity of the at least one securement mechanism 108 whilst allowing for the horizontal compression of the first prong 142.

On an outer edge or another edge or surface of the first prong 142, there are any number of size adjusters 146. The number of size adjusters 146 may vary and may be dependent on the length of the at least one securement mechanism 108. In some embodiments, and as shown in FIG. 6, the size adjusters 146 are present on both the outer edges of the first prong 142 and the second prong 144. The size adjusters 146 are protrusions configured to engage the adjustment receiving area(s) shown in FIG. 3. Thus, while the shape of the size adjusters 146 may vary, it is preferable that the shape of the size adjusters 146 and the adjuster receiving area(s) are corresponding to one another to allow for engagement of the size adjusters 146 and the adjustment receiving area(s).

The retainment edge 140 is configured to align with a portion, preferably a rim edge, of the utensil 200 (as depicted in FIG. 1). The retainment edge 140 moves laterally (inwards/outwards) along the sidewall portion 106 (as depicted in FIG. 1) as the at least one securement mechanism 108 is selectively positioned in the adjustment receiving area. It is preferable that the shape of the retainment edge 140 provides a portion to overlap with a portion of the utensil 200 (as depicted in FIG. 1). This allows for the retainment edge 140, when properly positioned, to retain the utensil 200 (as depicted in FIG. 1) to the holder 100 (as depicted in FIG. 1). Further, this allows for the utensil 200 (as depicted in FIG. 1) of varying dimensions to be utilized with the holder 100 (as depicted in FIG. 1) of the present application.

The second embodiment of the at least one securement mechanism 108 may be affixed to the sidewall portion 106 of the holder 100 and may be configured as planar flaps (as depicted in at least FIG. 7, FIG. 9, FIG. 11, and FIG. 13). In some examples of the second embodiment, the at least one securement mechanism 108 may comprise a quantity of three securement mechanisms. However, a quantity of the at least one securement mechanism 108 are not limited to the quantities explicitly listed herein.

The at least one securement mechanism 108 may be positioned at varying positions along the sidewall portion 106 of the holder 100. It is preferable that the at least one securement mechanism 108 is positioned such that the utensil retainment properties can be exploited for maximum effect and utensil securement. In some embodiments, there is at least one securement mechanism 108 positioned at each spoke of the holder 100. In other embodiments, not all spokes contain the at least one securement mechanism 108. In yet other embodiments, the at least one securement mechanism 108 is positioned such that the at least one securement mechanism 108 does not couple to a spoke of the holder 100.

Further, both the first embodiment and the second embodiment of the holder 100 may comprise a first magnetic component 134 (as depicted in FIG. 1, FIG. 4, FIG. 7, FIG. 9, FIG. 10, FIG. 11, FIG. 12, FIG. 13, FIG. 15, and FIG. 16) and a second magnetic component 112 (as depicted in FIG. 1, FIG. 2, FIG. 3, FIG. 7, FIG. 8, FIG. 9, FIG. 11, FIG. 12, FIG. 13, and FIG. 14). The first magnetic component 134 of the first embodiment of the holder 100 (as depicted in FIG. 1) may be planar or substantially planar in shape. In examples, the first magnetic component 134 of the first embodiment of the holder 100 (as depicted in FIG. 1) may be encapsulated in the base component 104.

In the first embodiment and the second embodiment of the holder 100, a magnetic material of the first magnetic component 134 and/or the second magnetic component 112 is removable. In such an embodiment, the magnetic material is accessed via a slot, door, or other mechanism that can selectively provide access to the magnetic material while securely the magnetic material within or coupled to the first magnetic component 134 and/or the second magnetic component 112. In other examples of the first embodiment and the second embodiment of the holder 100, the magnetic material is not removable from the first magnetic component 134 and/or the second magnetic component 112. In further examples, the first magnetic component 134 and/or the second magnetic component 112 are wholly formed from the magnetic material. It should be appreciated that the composition of the magnetic material is not limited to any particular compositions.

In this first embodiment, the first magnetic component 134 may be planar or substantially planar and may be encapsulated in the base portion 104 or is removable from the base portion 104. The first magnetic component 134 may be encapsulated in a sheath. In examples, the sheath is comprised of a first conical section and a second conical section. Further, the first conical section is coupled to the second conical section.

Figure 12:
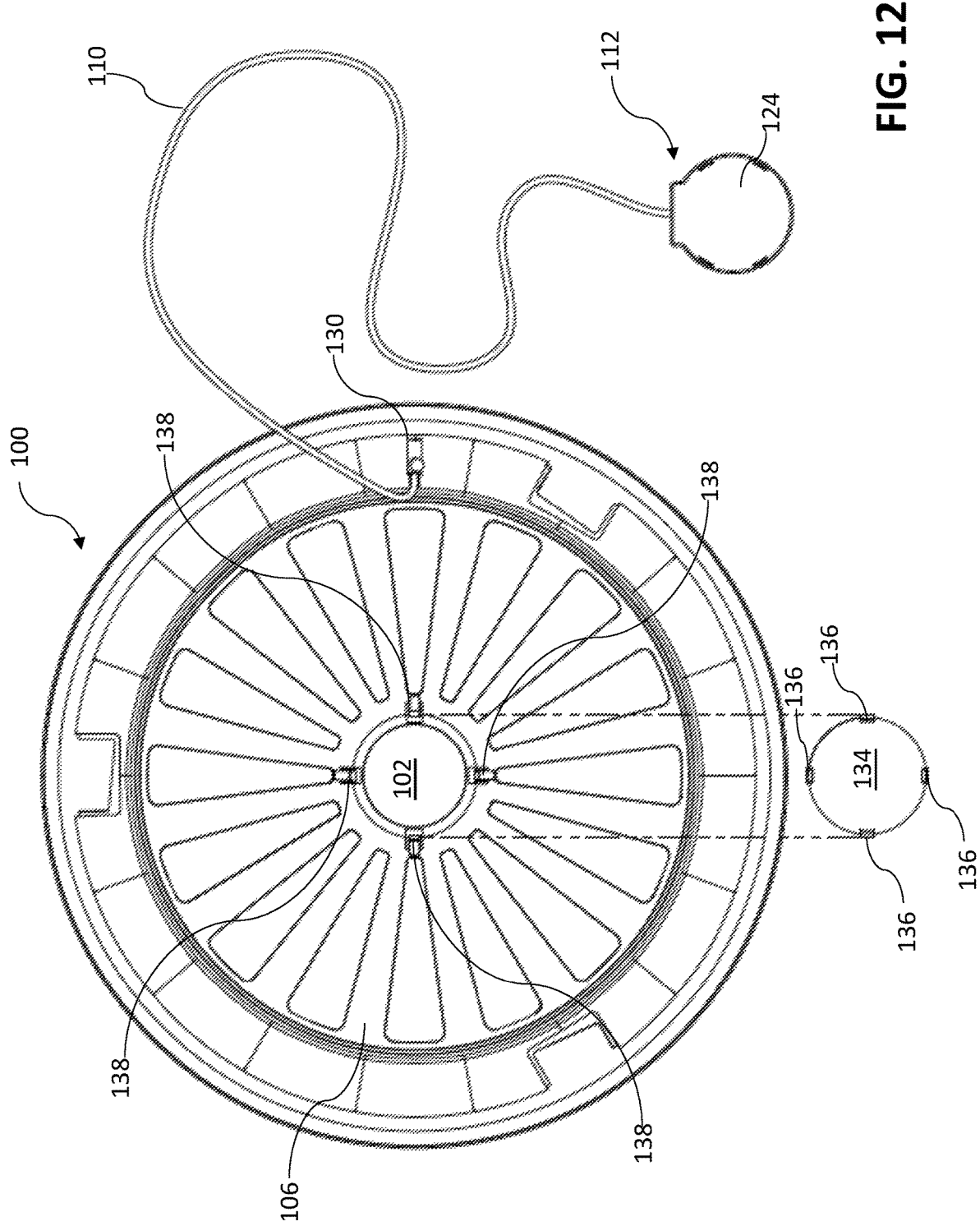
FIG. 12 depicts a bottom perspective view of a second embodiment of a utensil holder, according to at least some embodiments disclosed herein.
Figure 13:
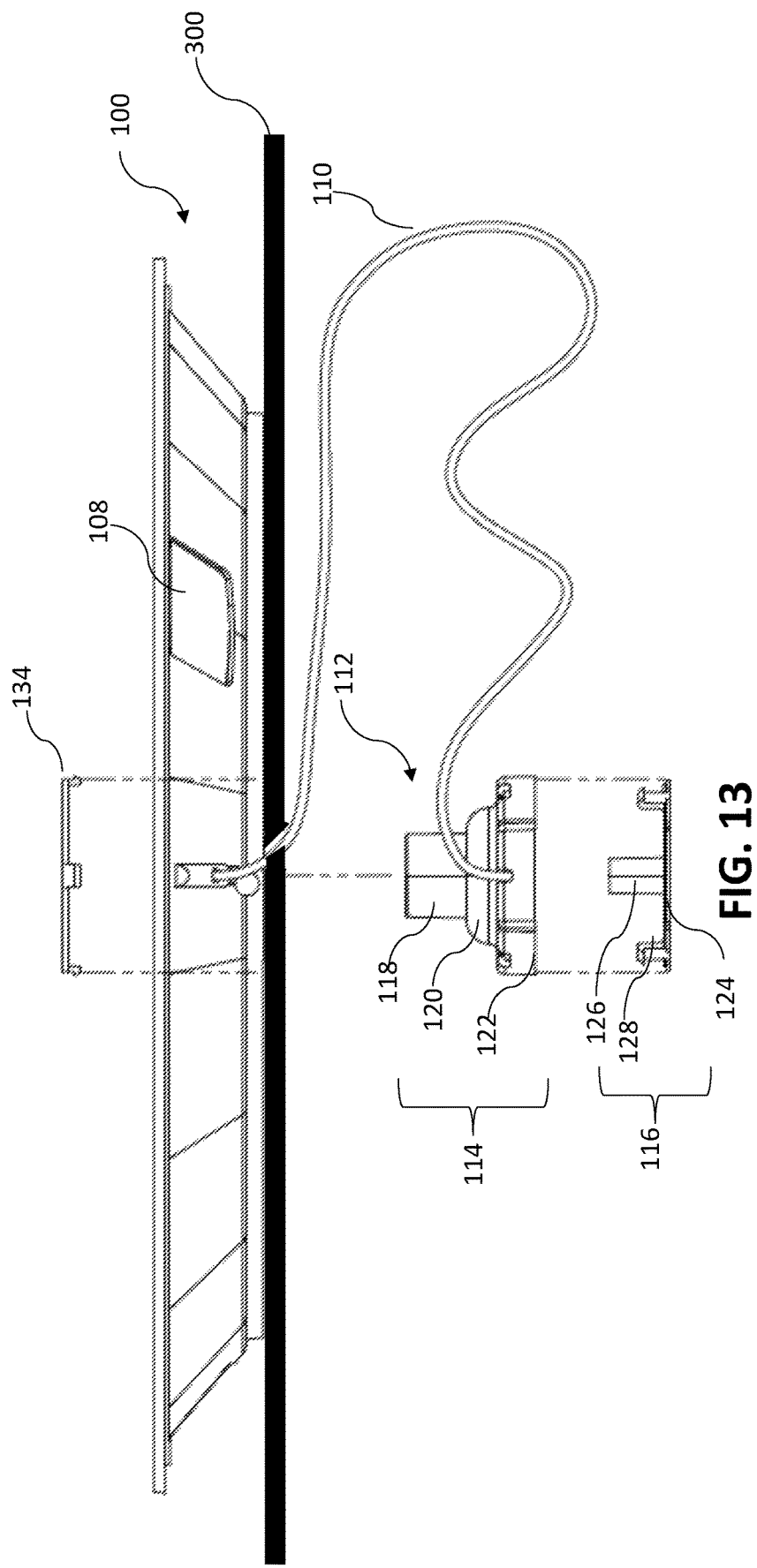
FIG. 13 depicts a side perspective view of a second embodiment of a utensil holder, according to at least some embodiments disclosed herein.
Figure 14:
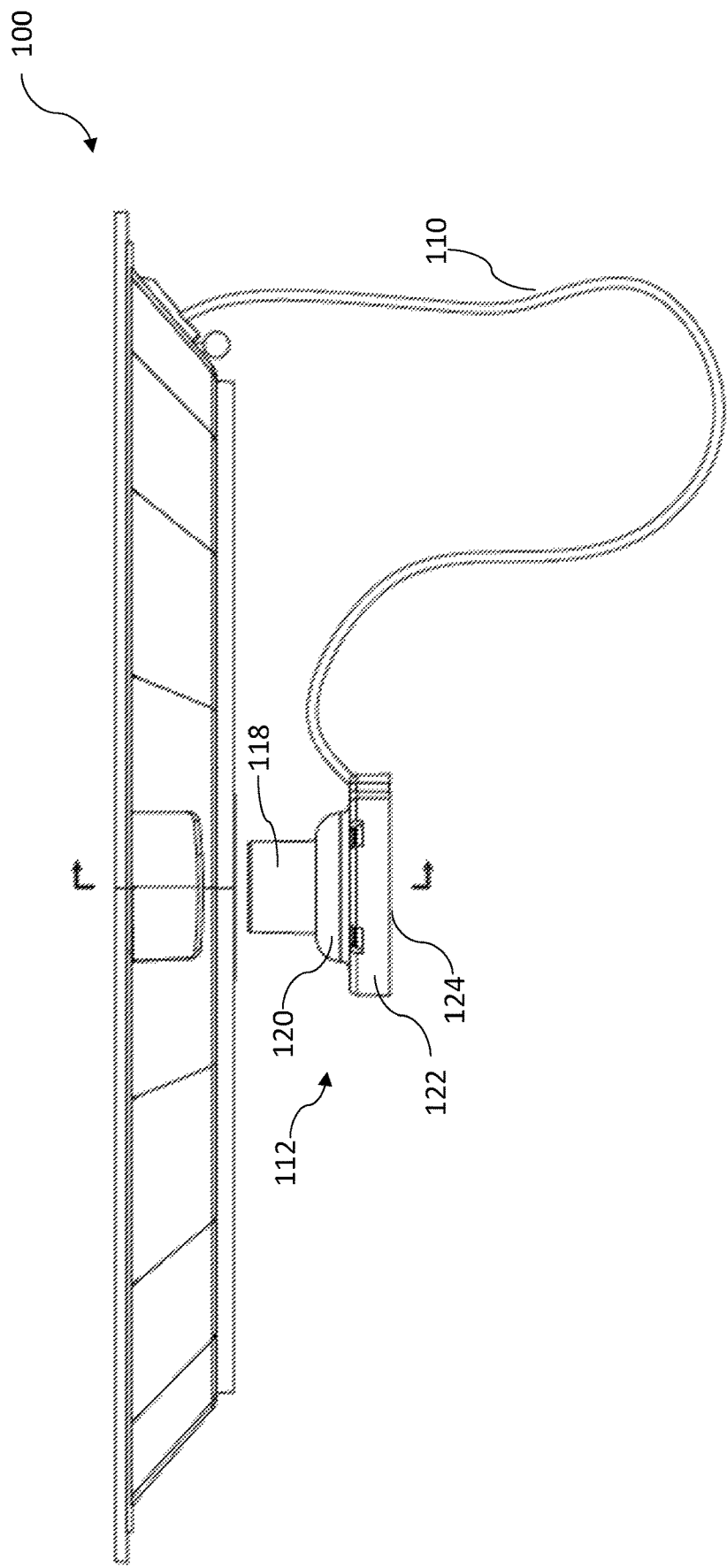
FIG. 14 depicts a side perspective view of a second embodiment of a utensil holder, according to at least some embodiments disclosed herein.
Figure 15:
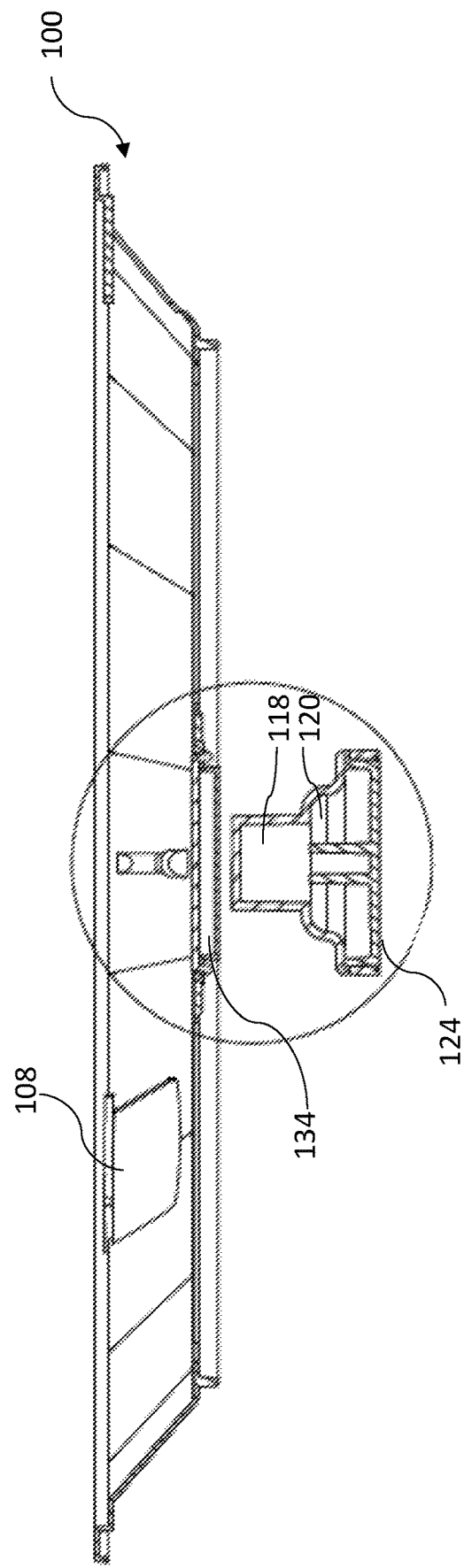
FIG. 15 depicts a side perspective view of a second embodiment of a utensil holder, according to at least some embodiments disclosed herein.

The first magnetic component 134 of the second embodiment of the holder 100 is planar or is substantially planar. In this second embodiment, the holder 100 may also include an opening 102 (depicted in FIG. 7, FIG. 11, and FIG. 12) is located in a center of the base portion 104 or substantially in the center of the base portion 104 and spans a width of the base portion 104. In examples, the opening 102 includes one or more recessed members 138 (as depicted in FIG. 7 and FIG. 12). In this embodiment, the first magnetic component 134 may also include one or more projecting members 136 (as depicted in FIG. 7 and FIG. 12) such that the first magnetic component 134 is received by the opening 102 of the base portion 104 and is secured to the base portion 104 of the holder 100 when the one or more projecting members 136 of the first magnetic component 134 are received by one or more recessed members 138 of the opening 102.

The second magnetic component 112 of the first embodiment of the holder 100 comprises a first section 114 and a second section 116 (as depicted in FIG. 1). In some examples, both of the first section 114 and the second section 116 comprise a magnetic portion. In other examples, one of the first section 114 and the second section 116 comprise the magnetic portion. In yet other embodiments, the second magnetic component 112 is wholly formed from a magnetic material.

Figure 2:
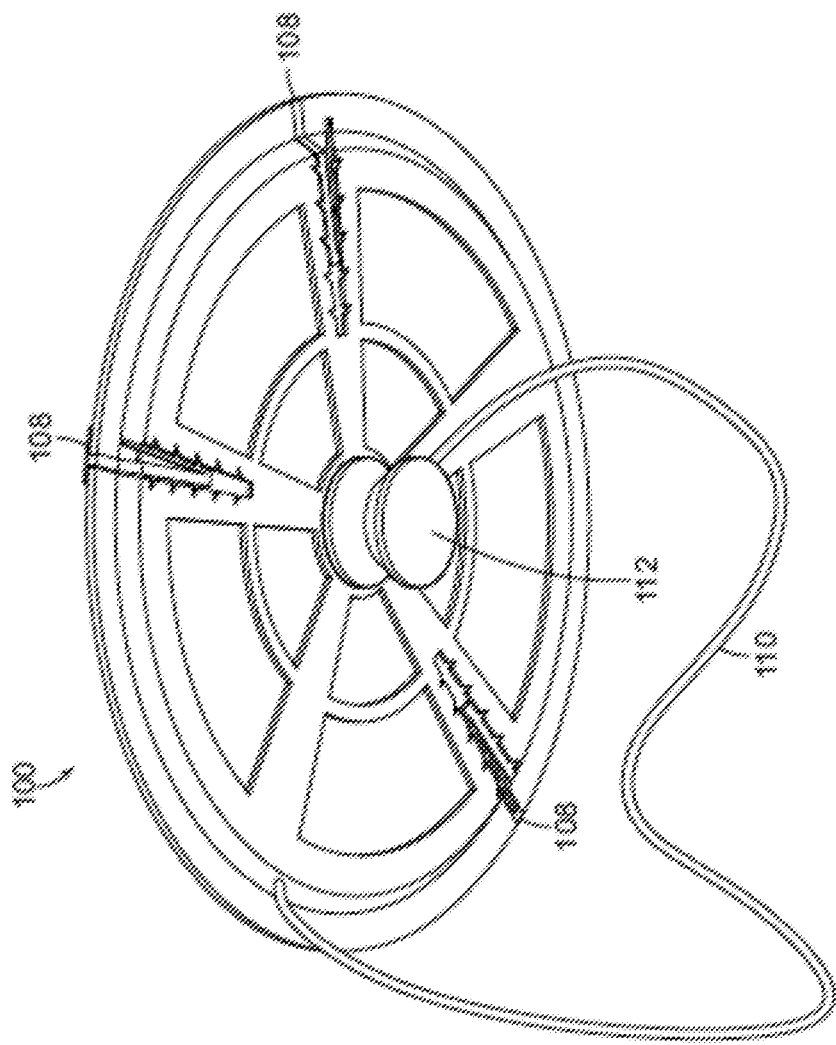
FIG. 2 depicts a lower perspective view of a first embodiment of a utensil holder, according to at least some embodiments disclosed herein.

In this embodiment, the first section 114 and the second section 116 are generally configured to be of the same dimensions. However, irregular or other configurations of the sections 114, 116 are contained under the purview of the present application. In at least one embodiment, the first section 114 forms a cone-like structure. That is, the base or top of the first section 114 is wider than a terminal portion of the first section 114. The second section 116 preferably has a corresponding shape. The terminal portion or pointed portion of each of the first section 114 and the second section 116 are coupled to one another. This allows for the second magnetic component 112 that, as a whole, has a top and a bottom that are wider than a central portion which is narrower than the top and bottom. This particular configuration allows for a user to securely carry the holder 100. This may be particularly helpful when a user is walking between a location where food is located and a seating area to eat the food placed upon the utensil 200. The magnetic properties of the second magnetic component 112 and the base component 104 allow for the second magnetic component 112 to be securely adhered to the holder 100 as shown in FIG. 2. Further, the user can position the second magnetic component 112 between at least two fingers of the user's hand further securing the holder 100 for transport.

The second embodiment of the holder 100 may also comprise the second magnetic component 112. In this embodiment, the second magnetic component 112 includes the first section 114 (depicted in FIG. 7, FIG. 8, FIG. 9, and FIG. 13) and the second section 116 (depicted in FIG. 7, FIG. 8, FIG. 10, and FIG. 13). In this second embodiment, the first section 114 of the second magnetic component 112 includes a first base portion 122 (depicted in FIG. 8, FIG. 13, and FIG. 14), a first protrusion 118 (depicted in FIG. 8, FIG. 9, FIG. 11, FIG. 13, FIG. 14, FIG. 15, and FIG. 16), and an intermediate portion 120 (depicted in FIG. 8, FIG. 9, FIG. 13, FIG. 14, FIG. 15, and FIG. 16) disposed between the first base portion 122 and the first protrusion 118. In some examples, the intermediate portion 120 comprises a sloped surface. In examples, the intermediate portion 120 includes one or more recessed members 132 (depicted in FIG. 8). A quantity of the one or more recessed members 132 is not limited to any specific quantities.

In this second embodiment, the second section 116 of the second magnetic component 112 includes: a second base portion 124 (depicted in FIG. 8, FIG. 12, FIG. 13, FIG. 14, FIG. 15, and FIG. 16) having a first side disposed opposite a second side. The first side of the second base portion 124 includes a second protrusion 126 (depicted in FIG. 8 and FIG. 13) and one or more projecting members 128 (depicted in FIG. 8 and FIG. 13). A quantity of the one or more projecting members 128 is not limited to any specific quantities. The one or more recessed members 132 of the intermediate portion 120 associated with the first section 114 of the second magnetic component 112 are configured to receive the one or more projecting members 128 of the second section 116 of the second magnetic component 112 to affix the first section 114 of the second magnetic component 112 to the second section 116 of the second magnetic component 112.

Additionally, in both the first embodiment and the second embodiment of the holder 100, the holder 100 may include a material 110 (depicted in FIG. 1, FIG. 2, FIG. 4, FIG. 7, and FIG. 9-FIG. 14) having a first side disposed opposite a second side. In examples, the first side of the material 110 may be affixed to a location 130 (as depicted in FIG. 7, FIG. 9, and FIG. 10-FIG. 13) on the sidewall portion 106. The second side of the material 110 is affixed to the second magnetic component 112.

A length of the material 110 will prevent the second magnetic component 112 from becoming lost. In some examples, the material 110 is permanently affixed to the location 130 on the sidewall portion 106 and the second magnetic component 112. In some examples, the material 110 is removably coupled to the location 130 on the sidewall portion 106 and/or the second magnetic component 112, thereby allowing a user to decide if they want to utilize the second component 112 or not.

In some examples, the material 110 is flexible enough to allow free movement the second component 112 attached thereto, but resilient enough to resist breaking or separating from the location 130 on the sidewall portion 106 and the second component 112. In at least one embodiment, the material 110 has elastic properties allowing it to be selectively stretched to meet length requirements and different sized tabletops, thereby increasing the situations in which the holder 100 may be used.

As alluded to, the second side of the base portion 104 is disposed along the surface 300. In examples, the surface 300 may be a tabletop. Typically, when the user will sit down to eat, particularly outdoors, wind and other natural elements can cause the utensil 200 to be knocked or otherwise blown off the surface 300 (such as the tabletop). The present invention and its embodiments not only secure the utensil 200 to the holder 100, but further secure the holder 100 to the surface 300 (such as the tabletop).

To use the second embodiment of the holder 100, the first magnetic component 134 may first be received by the opening 102 of the base portion 104 and may be secured to the base portion 104 of the holder 100 when the one or more projecting members 136 of the first magnetic component 134 are received by the one or more recessed members 138 of the opening 102. To use the first embodiment of the holder 100, this first step may be omitted. Then, to use either the first or the second embodiment of the holder 100, the user will position the utensil 200 in the utensil receiving portion of the holder 100. The at least one securement mechanism 108 may then be used to secure or retain the utensil 200 to the holder 100 to prevent the utensil 200 from inadvertently being blown away or from falling out of the holder 100. Since the first magnetic component 134 and the second magnetic component 112 are of differing polarities, once the holder 100 receives the utensil 200 and is positioned upon the surface 300 (such as the tabletop), the second magnetic component 122 is placed beneath the surface 300 such that the first magnetic component 134 is configured in a magnetic attraction with the second magnetic component 112 to maintain a location of the holder 100 (and additionally the utensil 200) on the surface 300. Such magnetic attraction occurs through the surface 300 (such as the tabletop). As a result, the holder 100 is "magnetically adhered" to the surface 300 (such as the tabletop).

In order to remove the holder 100, the user may remove the second magnetic component 112 and lift up on the holder 100 in a direction away from the surface 300. Alternatively, the user can simply lift up on the holder 100 in the direction away from the surface 300, thereby "breaking" the magnetic attraction between the base portion 104, the first magnetic component 134, and the second magnetic component 112.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A holder for a utensil, the holder comprising:
a base portion having a first side disposed opposite a second side;
a sidewall portion coupled to a periphery of and extending outward from the first side of the base portion, the sidewall portion and the first side of the base portion defining a utensil receiving portion;
at least one securement mechanism engaged to the sidewall portion;
a first magnetic component;
a second magnetic component;
a material having a first side disposed opposite a second side, the first side of the material being affixed to a location on the sidewall portion and the second side of the material being affixed to the second magnetic component; and
an opening spanning a width of the base portion, wherein:
the first magnetic component comprises one or more projecting members,
the opening comprises one or more recessed members, and
the first magnetic component is received by the opening and is secured to the base portion of the holder when the one or more projecting members are received by the one or more recessed members.

2. The holder for the utensil of claim 1, wherein each of the at least one securement mechanism comprises a planar flap, and wherein each of the at least one securement mechanism is affixed to the sidewall portion.

3. The holder of the utensil of claim 1, wherein:
the first magnetic component is planar and is encapsulated in the base portion or is removable from the base portion,
the first magnetic component is encapsulated in a sheath,
the sheath is comprised of a first conical section and a second conical section, and
the first conical section is coupled to the second conical section.

4. The holder of the utensil of claim 1, wherein the second magnetic component comprises a first section and a second section.

5. The holder of the utensil of claim 4, wherein the first section of the second magnetic component comprises:
a first base portion;
a first protrusion; and
an intermediate portion disposed between the first base portion and the first protrusion, wherein the intermediate portion comprises one or more recessed members.

6. The holder of the utensil of claim 4, wherein the second section of the second magnetic component comprises:
a second base portion having a first side disposed opposite a second side;
the first side of the second base portion comprising:
a second protrusion; and
one or more projecting members.

7. The holder of the utensil of claim 6, wherein the one or more recessed members of the intermediate portion associated with the first section of the second magnetic component are configured to receive the one or more projecting members of the second section of the second magnetic component to affix the first section of the second magnetic component to the second section of the second magnetic component.

8. The holder of the utensil of claim 4, wherein:
the first section is coupled to the second section,
the first section comprises a first base portion and a first terminal portion, and
the second section comprises a second base portion and a second terminal portion.

9. The holder of the utensil of claim 8, wherein each of the first base portion and the second base portion are wider than the first terminal portion and the second terminal portion.

10. A holder for a utensil, the holder comprising:
a base portion having a first side disposed opposite a second side, the second side being disposed along a surface;
a sidewall portion coupled to a periphery of and extending outward from the first side of the base portion, the sidewall portion and the first side of the base portion defining a utensil receiving portion;
at least one securement mechanism engaged to the sidewall portion;
a first magnetic component,
the first magnetic component is planar and is encapsulated in the base portion or is removable from the base portion;
a second magnetic component, wherein the first magnetic component and the second magnetic component are of opposing polarities;
a material having a first side disposed opposite a second side, the first side of the material being affixed to a location on the sidewall portion and the second side of the material being affixed to the second magnetic component; and an opening spanning a width of the base portion, wherein:
the first magnetic component comprises one or more projecting members,
the opening comprises one or more recessed members, and
the first magnetic component is received by the opening and is secured to the base portion of the holder when the one or more projecting members are received by the one or more recessed members.

11. The holder of the utensil of claim 10, wherein the utensil is a plate.

12. The holder of the utensil of claim 10, wherein the second magnetic component is placed beneath the surface such that the first magnetic component is configured in a magnetic attraction with the second magnetic component to maintain a location of the holder on the surface.

13. The holder of the utensil of claim 10, wherein:
each of the at least one securement mechanism comprises a planar flap, and
each of the at least one securement mechanism is affixed to the sidewall portion.

* * * * *